(12) United States Patent
Wu

(10) Patent No.: US 11,514,367 B2
(45) Date of Patent: *Nov. 29, 2022

(54) COMPUTER-BASED SYSTEMS AND METHODS CONFIGURED TO UTILIZE AUTOMATING DEPLOYMENT OF PREDICTIVE MODELS FOR MACHINE LEARNING TASKS

(71) Applicant: Capital One Services, LLC, McLean, VA (US)

(72) Inventor: Chen Wu, Vienna, VA (US)

(73) Assignee: Capital One Services, LLC, McLean, VA (US)

( * ) Notice: Subject to any disclaimer, the term of this patent is extended or adjusted under 35 U.S.C. 154(b) by 35 days.

This patent is subject to a terminal disclaimer.

(21) Appl. No.: 17/132,930

(22) Filed: Dec. 23, 2020

(65) Prior Publication Data

US 2021/0117827 A1 Apr. 22, 2021

Related U.S. Application Data

(63) Continuation of application No. 16/511,671, filed on Jul. 15, 2019, now Pat. No. 10,891,327, which is a
(Continued)

(51) Int. Cl.
*G06F 17/00* (2019.01)
*G06N 20/00* (2019.01)
(Continued)

(52) U.S. Cl.
CPC ........... *G06N 20/00* (2019.01); *G06F 3/0484* (2013.01); *G06F 8/30* (2013.01); *G06F 8/71* (2013.01); *G06F 9/451* (2018.02); *G06F 16/38* (2019.01); *G06F 16/84* (2019.01); *G06F 16/906* (2019.01); *G06F 16/907* (2019.01); *G06F 16/9535* (2019.01); *G06K 9/6256* (2013.01); *G06K 9/6263* (2013.01); *G06N 3/08* (2013.01);
(Continued)

(58) Field of Classification Search
CPC ........... G06N 20/00; G06N 3/08; G06N 5/04; G06K 9/6256; G06K 9/6263
See application file for complete search history.

(56) References Cited

U.S. PATENT DOCUMENTS 6,226,692 B1 5/2001 Miloushev et al.
9,489,630 B2 11/2016 Achin et al.
(Continued)

*Primary Examiner* — Tuan A Vu
(74) *Attorney, Agent, or Firm* — Greenberg Traurig, LLP

(57) ABSTRACT

A method includes obtaining feature generation code from, which is configured to determine features relating to input data. The method further includes obtaining data grouping code, which is configured to generate training data by determining a plurality of data groupings for the features relating to the input data. The method further includes obtaining modeling code, which is derived at least in part by applying one or more machine learning algorithms to the training data. The method further includes applying a model wrapper code to the feature generation code, the data grouping code, and the modeling code to generate a model wrapper and deploying the model wrapper such that the model wrapper may receive a first application programming interface (API) call including an input data value, determine a score relating to the input data value, and send a second API call including the score in response to the first API call.

20 Claims, 9 Drawing Sheets

Related U.S. Application Data continuation of application No. 16/510,368, filed on Jul. 12, 2019, now Pat. No. 10,614,382.

(51) Int. Cl.

| | | |
|---|---|---|
| G06F 8/30 | (2018.01) | |
| G06F 8/71 | (2018.01) | |
| G06K 9/62 | (2022.01) | |
| G06F 9/451 | (2018.01) | |
| G06F 16/907 | (2019.01) | |
| G06F 16/84 | (2019.01) | |
| G06F 16/906 | (2019.01) | |
| G06F 16/9535 | (2019.01) | |
| G06N 3/08 | (2006.01) | |
| G06N 5/04 | (2006.01) | |
| G06F 16/38 | (2019.01) | |
| G06F 3/0484 | (2022.01) | |
| G06F 8/36 | (2018.01) | |
| G06F 8/60 | (2018.01) | |

(52) U.S. Cl.
CPC ............... *G06N 5/04* (2013.01); *G06F 8/36* (2013.01); *G06F 8/60* (2013.01); *G06F 16/86* (2019.01); *Y10S 707/99948* (2013.01)

(56) References Cited

U.S. PATENT DOCUMENTS

| | | |
|---|---|---|
| 10,223,658 B2 | 3/2019 | Cornilescu |
| 2015/0379072 A1 | 12/2015 | Dirac et al. |

COMPUTER-BASED SYSTEMS AND METHODS CONFIGURED TO UTILIZE AUTOMATING DEPLOYMENT OF PREDICTIVE MODELS FOR MACHINE LEARNING TASKS

CROSS-REFERENCE TO RELATED APPLICATION

This application is a continuation of and claims priority to U.S. patent application Ser. No. 16/511,671, filed on Jul. 15, 2019, which is a continuation of and claims the benefit of U.S. patent application Ser. No. 16/510,368, filed on Jul. 12, 2019 (now granted as U.S. Pat. No. 10,614,382), the disclosures of each of which are hereby expressly incorporated by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved computer-based platforms/systems, improved computing devices/components and/or improved computing objects configured for one or more novel technological applications of automated deployment of a predictive model.

BACKGROUND OF TECHNOLOGY

A computer network platform/system may include a group of computers (e.g., clients, servers, smart routers (e.g., trading smart routers)) and other computing hardware devices that are linked together through one or more communication channels to facilitate communication and/or resource-sharing, via one or more specifically programmed graphical user interfaces (GUIs) of the present disclosure, among a wide range of users.

SUMMARY OF DESCRIBED SUBJECT MATTER

In some embodiments, the present disclosure provides an exemplary technically improved computer-based method that includes at least the following elements of obtaining, by one or more processors, feature generation code from a feature generation code repository. The feature generation code is configured to determine features relating to input data. The method further includes obtaining, by the one or more processors, data grouping code from a data grouping code repository. The data grouping code is configured to generate training data by determining a plurality of data groupings for the features relating to the input data. The method further includes obtaining, by the one or more processors, modeling code from a modeling code repository. The modeling code is derived at least in part by applying one or more machine learning algorithms to the training data. The method further includes applying, by the one or more processors, a model wrapper code to the feature generation code, the data grouping code, and the modeling code to generate a model wrapper. The method further includes deploying, by the one or more processors, the model wrapper such that, after deployment, the model wrapper is configured to receive a first application programming interface (API) call including an input data value, determine a score relating to the input data value, and send a second API call including the score in response to the first API call. The method further includes obtaining updated code. The updated code includes one or two of, but not all three of, an updated feature generation code, an updated data grouping code, or an updated modeling code. The method further includes applying the model wrapper code to the updated code to generate an updated model wrapper.

In some embodiments, the present disclosure provides an exemplary technically improved computer-based system that includes at least the following components of a memory and at least one processor coupled to the memory. The processor is configured to obtain feature generation code from a feature generation code repository. The feature generation code is configured to determine features relating to input data. The processor is further configured to obtain data grouping code from a data grouping code repository. The data grouping code is configured to generate training data by determining a plurality of data groupings for the features relating to the input data. The processor is further configured to obtain modeling code and modeling code configuration files from a modeling code repository. The modeling code is derived at least in part by applying one or more machine learning algorithms to the training data, and the modeling code configuration files include information about the format and contents of the modeling code. The processor is further configured to apply a model wrapper code to the feature generation code, the data grouping code, and the modeling code to generate a model wrapper. The processor is further configured to deploy the model wrapper such that, after deployment, the model wrapper is configured to receive a first application programming interface (API) call including an input data value, determine a score relating to the input data value, and send a second API call including the score in response to the first API call.

In some embodiments, the present disclosure provides an exemplary technically improved computer-based non-transitory computer readable medium that includes instructions stored thereon that, upon execution of a computing device, cause the computing device to perform operations of obtaining feature generation code from a feature generation code repository. The feature generation code is configured to determine features relating to input data. The instructions further cause the computing device to perform operations of obtaining, by the one or more processors, data grouping code from a data grouping code repository. The data grouping code is configured to generate training data by determining a plurality of data groupings for the features relating to the input data, wherein the plurality of data groupings including a wildcard data grouping, and assigning at least one unrecognized feature relating to the input data to the wildcard data grouping. The instructions further cause the computing device to perform operations of obtaining modeling code from a modeling code repository. The modeling code is derived at least in part by applying one or more machine learning algorithms to the training data. The instructions further cause the computing device to perform operations of applying a model wrapper code to the feature generation code, the data grouping code, and the modeling code to generate a model wrapper. The instructions further cause the computing device to perform operations of deploying the model wrapper such that, after deployment, the model wrapper is configured to receive a first application programming interface (API) call including an input data value, determine a score relating to the input data value, and send a second API call including the score in response to the first API call.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
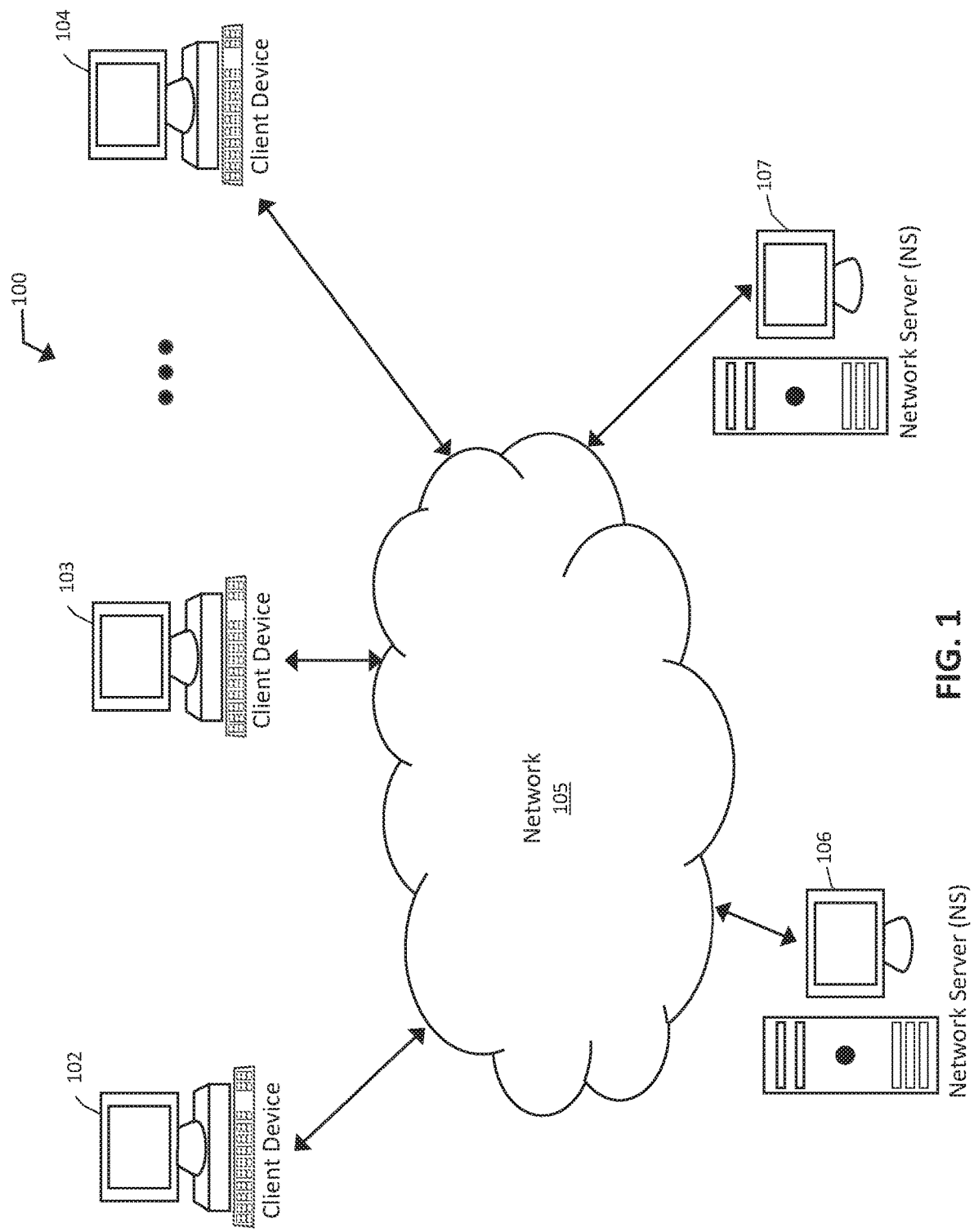
FIG. 1 is a block diagram depicting a computer-based system and platform in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIGS. 3 and 4) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) Ios; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37) Open Web Platform; (38) Oracle Database; (39) Qt; (40) SAP NetWeaver; (41) Smartface; (42) Vexi; and/or (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-10,000,000,000).

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

Figure 3:
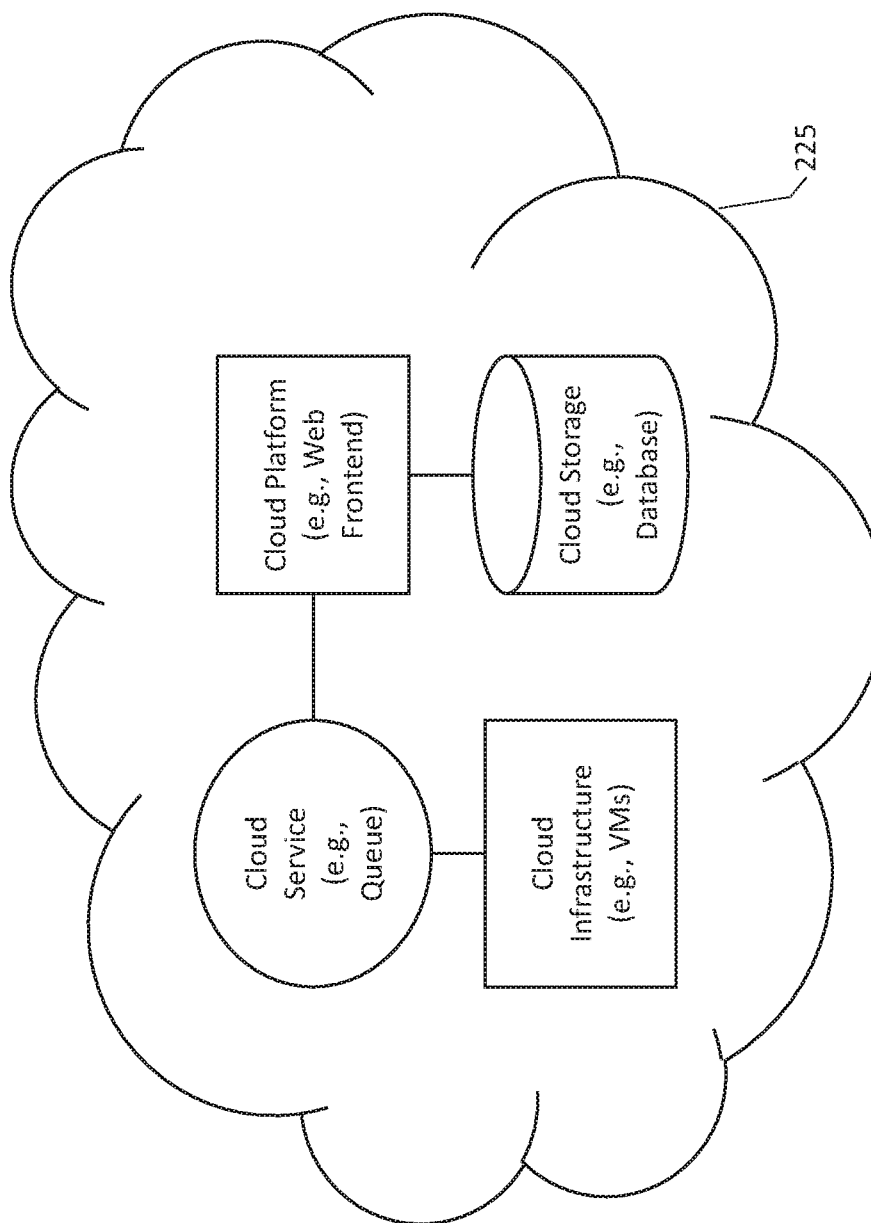
FIGS. 3 and 4 are diagrams illustrating implementations of cloud computing architecture/aspects with respect to which the disclosed technology may be specifically configured to operate, in accordance with one or more embodiments of the present disclosure.
Figure 4:
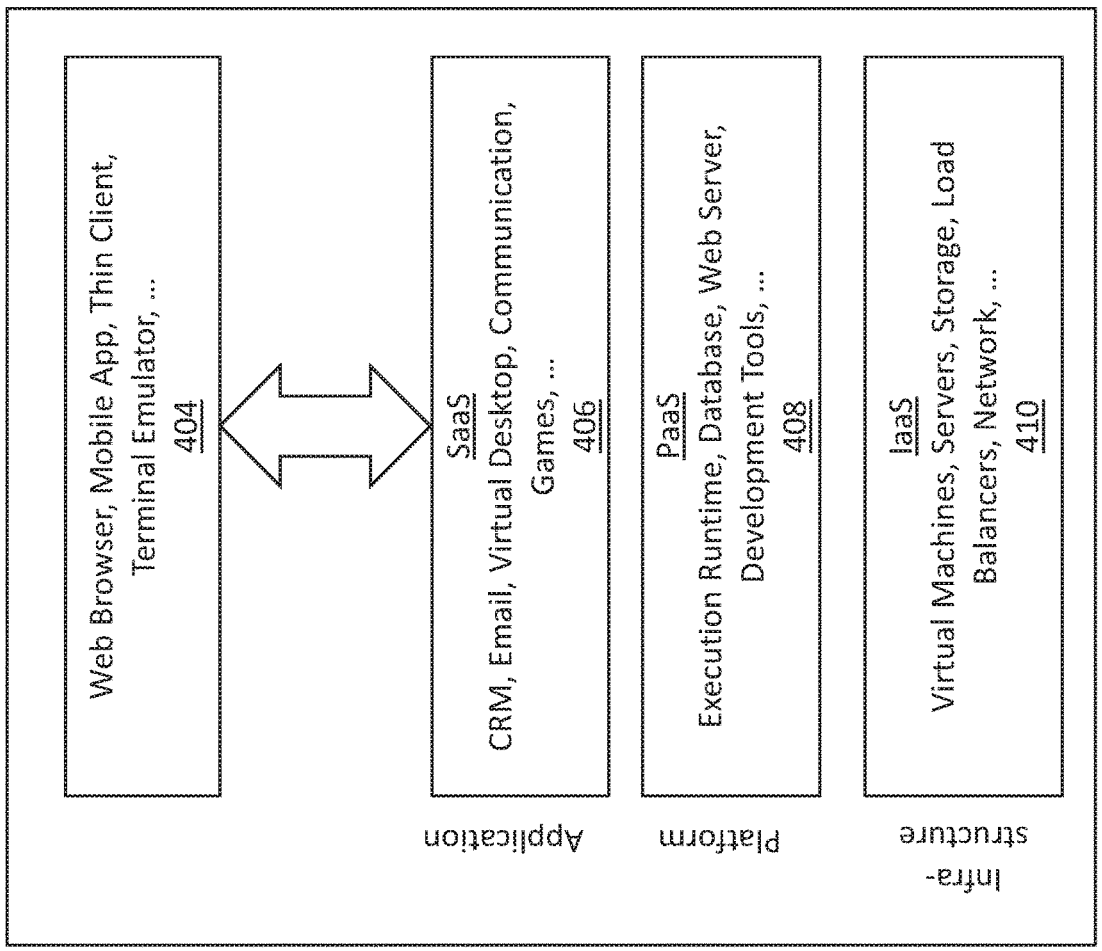

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). Examples of such cloud components are shown in FIGS. 3 and 4.

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIP-EMD-160, RTR0, SHA-1, SHA-2, Tiger (TTH), WHIRL-POOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

FIG. 1 is a block diagram depicting a computer-based system and platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 100 may be configured to manage a large number of members and/or concurrent transactions, as detailed herein. In some embodiments, the exemplary computer-based system/platform 100 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 1, members 102-104 (e.g., clients) of the exemplary computer-based system/platform 100 may include virtually any computing device capable of receiving and sending a message over a network (e.g., cloud network), such as network 105, to and from another computing device, such as servers 106 and 107, each other, and the like. In some embodiments, the member devices 102-104 may be personal computers, multiprocessor systems, microprocessor-based or programmable consumer electronics, network PCs, and the like. In some embodiments, one or more member devices within member devices 102-104 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 102-104 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 102-104 may include may run one or more applications, such as Internet browsers, mobile applications, voice calls, video games, videoconferencing, and email, among others. In some embodiments, one or more member devices within member devices 102-104 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 102-104 may be specifically programmed by either Java, .Net, QT, C, C++ and/or other suitable programming language. In some embodiments, one or more member devices within member devices 102-104 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 105 may provide network access, data transport and/or other services to any computing device coupled to it. In some embodiments, the exemplary network 105 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 105 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 105 may include and implement, as an alternative or in conjunction with one or more of the above, a WiMAX architecture defined by the WiMAX forum. In some embodiments and, optionally, in combination of any embodiment described above or below, the exemplary network 105 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 105 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 105 may also include mass storage, such as network attached storage (NAS), a storage area network (SAN), a content delivery network (CDN) or other forms of computer or machine readable media.

In some embodiments, the exemplary server 106 or the exemplary server 107 may be a web server (or a series of servers) running a network operating system, examples of which may include but are not limited to Microsoft Windows Server, Novell NetWare, or Linux. In some embodiments, the exemplary server 106 or the exemplary server 107 may be used for and/or provide cloud and/or network computing. Although not shown in FIG. 1, in some embodiments, the exemplary server 106 or the exemplary server 107 may have connections to external systems like email, SMS messaging, text messaging, ad content providers, etc. Any of the features of the exemplary server 106 may be also implemented in the exemplary server 107 and vice versa.

In some embodiments, one or more of the exemplary servers 106 and 107 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 101-104.

In some embodiments and, optionally, in combination of any embodiment described above or below, for example, one or more exemplary computing member devices 102-104, the exemplary server 106, and/or the exemplary server 107 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 2:
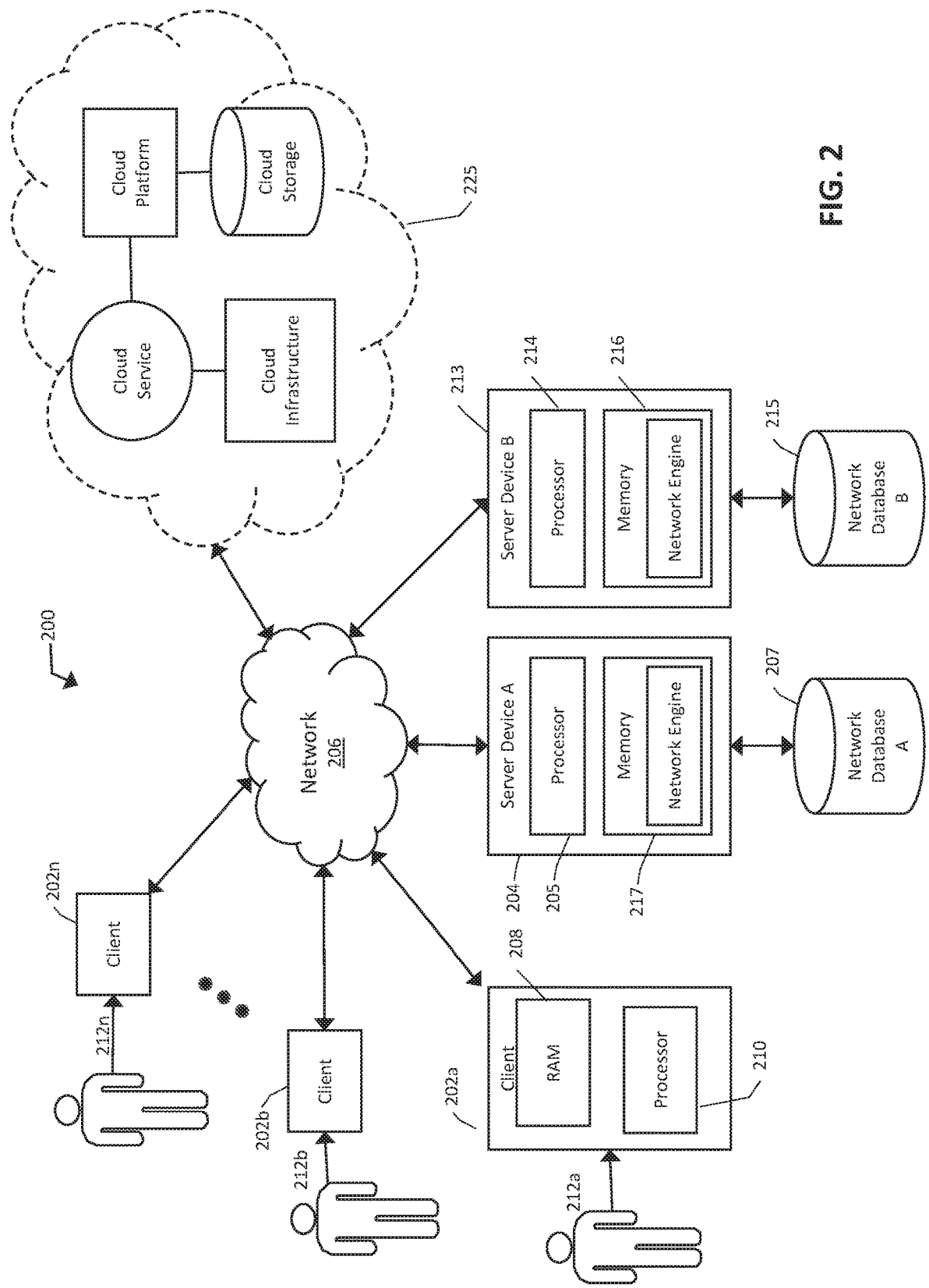
FIG. 2 is a block diagram depicting another computer-based system and platform in accordance with one or more embodiments of the present disclosure.

FIG. 2 depicts a block diagram of another exemplary computer-based system/platform 200 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 202a, 202b thru 202n shown each at least includes a computer-readable medium, such as a random-access memory (RAM) 208 coupled to a processor 210 or FLASH memory. In some embodiments, the processor 210 may execute computer-executable program instructions stored in memory 208. In some embodiments, the processor 210 may include a microprocessor, an ASIC, and/or a state machine. In some embodiments, the processor 210 may include, or may be in communication with, media, for example computer-readable media, which stores instructions that, when executed by the processor 210, may cause the processor 210 to perform one or more steps described herein. In some embodiments, examples of computer-readable media may include, but are not limited to, an electronic, optical, magnetic, or other storage or transmission device capable of providing a processor, such as the processor 210 of client 202a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 202a-n may also comprise a number of external or internal devices such as a mouse, a CD-ROM, DVD, a physical or virtual keyboard, a display, or other input or output devices. In some embodiments, examples of member computing devices 202a-n (e.g., clients) may be any type of processor-based platforms that are connected to a network 206 such as, without limitation, personal computers, digital assistants, personal digital assistants, smart phones, pagers, digital tablets, laptop computers, Internet appliances, and other processor-based devices. In some embodiments, member computing devices 202a-n may be specifically programmed with one or more application programs in accordance with one or more principles/methodologies detailed herein. In some embodiments, member computing devices 202a-n may operate on any operating system capable of supporting a browser or browser-enabled application, such as Microsoft™, Windows™, and/or Linux. In some embodiments, member computing devices 202a-n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 202a-n, users, 212a-n, may communicate over the exemplary network 206 with each other and/or with other systems and/or devices coupled to the network 206. As shown in FIG. 2, exemplary server devices 204 and 213 may be also coupled to the network 206. In some embodiments, one or more member computing devices 202a-n may be mobile clients.

In some embodiments, at least one database of exemplary databases 207 and 2015 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

As also shown in FIGS. 2 and 3, some embodiments of the disclosed technology may also include and/or involve one or more cloud components 225, which are shown grouped together in the drawing for sake of illustration, though may be distributed in various ways as known in the art. Cloud components 225 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

According to some embodiments shown by way of one example in FIG. 4, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 410, platform as a service (PaaS) 408, and/or software as a service (SaaS) 406. FIGS. 3 and 4 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate.

Described herein are methods, systems, computer readable media, etc. for the automated deployment of predictive models. In various embodiments, other models than predictive models may be deployed using similar methods, systems, computer readable media, etc. Such embodiments as described herein provide a continuous integration and continuous delivery (CICD) solution for building and deploying models that drastically reduces the amount of time, effort, processing power and other resources used to build and deploy a model. For example, a model that is already built and deployed may be rapidly refit and deployed using the automated processes described herein. Accordingly, such processes provide for refitting models as the automated model deployment described herein may take much less time to refit and deploy a model than other processes.

As just one example, machine learning model refits may take three or more months to complete. Computing, processing, and other resources may be idle during certain parts of a development or refit phase for an exemplary predictive model, but the resources may be significantly taxed during the period immediately before deploying the model or refit. By making the component inputs of a model independent of one another according to the various embodiments described herein, the refits may be developed and deployed much more quickly, using fewer resources (e.g., utilizing less processing power, utilizing less computing memory, utilizing less programming effort, and the like).

In some embodiments, various predictive models for various machine-learning tasks as described herein may be used to, for example, deliver content to a client device, such as the client devices 102, 103, 104 of FIG. 1 and/or the client devices 202a, 202b, 202n of FIG. 2. For example, information about a client device and/or a user of a client device (e.g., internet protocol (IP) address, user name, client device location, client device type) may be determined by a server (e.g. servers 106, 107, 204, 213, or cloud server devices of FIGS. 1-4). For example, a server may determine information about a user and/or client device when the client device requests a web page (e.g., by the user clicking a universal resource indicator (URI)). An exemplary predictive model may use information determined about a user and/or client device to predict other information about the user and/or client. As just one nonlimiting example, information about the location of the client device and the client device type may be used by an exemplary predictive model to predict the user of the client device's yearly income.

Figure 5:
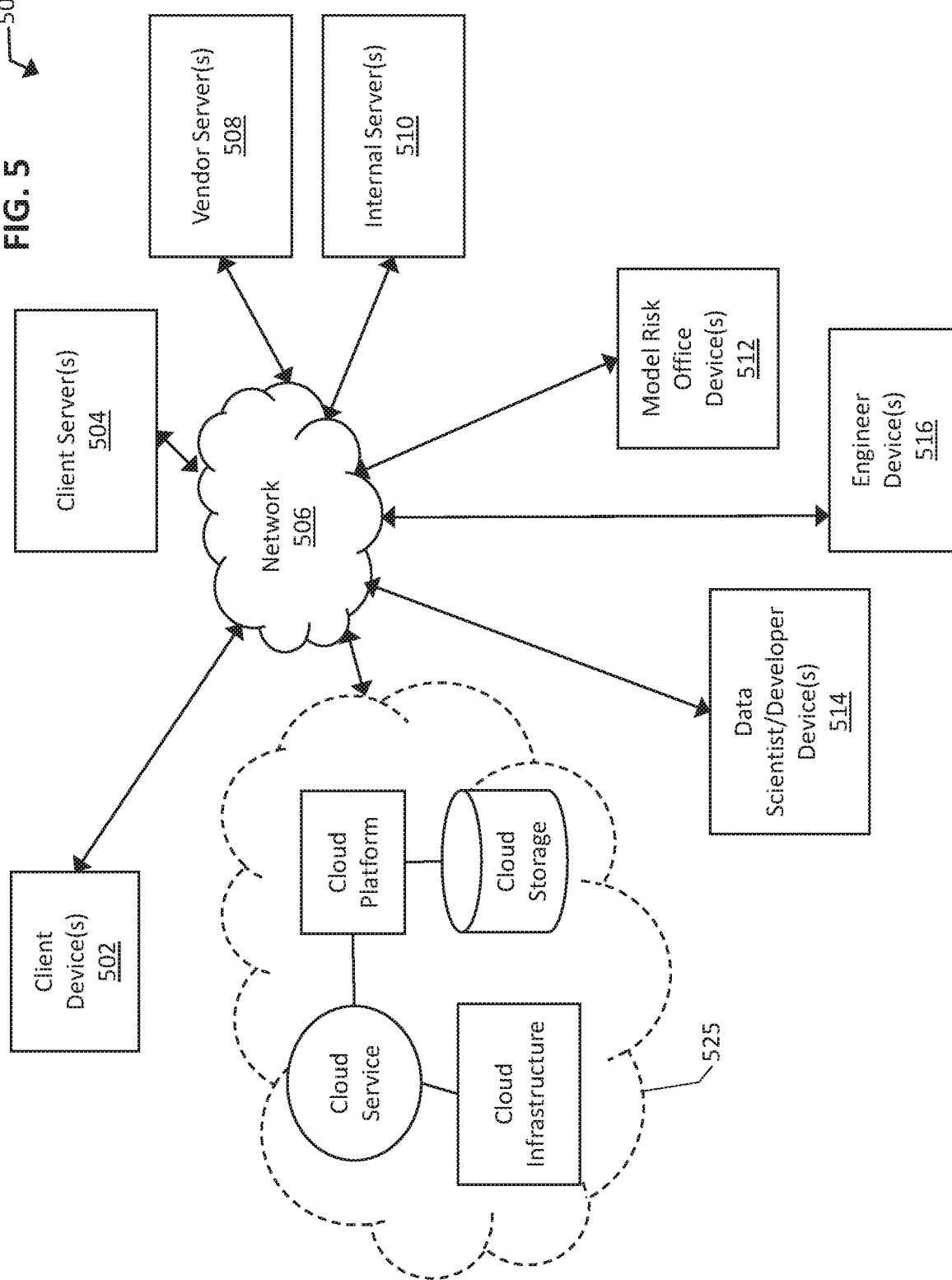
FIG. 5 is a block diagram of a system for automating deployment of a predictive model in accordance with one or more embodiments of the present disclosure.

FIG. 5 is a block diagram of a system 500 for automating deployment of a predictive model in accordance with one or more embodiments of the present disclosure. The system 500 includes client device(s) 502, client server(s) 504, vendor server(s) 508, internal server(s) 510, model risk office device(s) 512, data scientist/developer device(s) 514, engineer device(s) 516, and one or more cloud components 525. The one or more cloud components 525 may be or include components of the cloud components 225 shown in FIGS. 2-4 and described herein. The various processes may be implemented by more, less, and/or any combination of the devices, components, etc. shown in FIG. 5. Any of the processes or functions described herein may also be implemented on different devices shown in FIG. 5. For example, processes described herein may be implemented on any of the servers 504, 508, 510 and/or the one or more cloud components 525. That is, the one or more cloud components 525 may function similarly to one or more of the servers 504, 508, 510, at least with respect to the embodiments described herein.

In the example of FIG. 5, the client device(s) 502 may communicate with the client server(s) 504. In the communications, for example, the client server(s) 504 may respond to a URI request from the client device(s) 502 via the network 506 to server a web page or other type of information. When an exemplary predictive model is used by the client server(s) 504, the client server(s) 504 may also use the predictive model to predict information about the client device(s) 502 or a user associated with the client device(s) 502. In various embodiments, the client device(s) 502 may not have access to or be able to communicate with some other aspects of FIG. 5, such as one or more of the vendor server(s) 508, the internal server(s) 510, the model risk office device(s) 512, the data scientist/developer device(s) 514, and/or the engineer device(s) 516. For example, the client device(s) 502 may not be able to access those devices because they are used to build and deploy an exemplary predictive model.

The predictive model may be deployed to the client server(s) 504 (or otherwise be deployed such that the client server(s) 504 may communicate with a device where the predictive model is deployed), such that predictive model may be used without accessing or influencing the development, refit, deployment, etc. of a model that may be taking place on one or more of the vendor server(s) 508, the internal server(s) 510, the model risk office (MRO) device(s) 512, the data scientist/developer device(s) 514, and/or the engineer device(s) 516. In this way, refitting may take place while an earlier version of a model is already deployed, and the predictive model deployed to the client server(s) 504 (or otherwise be deployed such that the client server(s) 504 may communicate with a device where the predictive model is deployed) does not need to communicate with any of the other devices to use the deployed predictive model. As further described herein, such a system increases efficiency of the model and preserves computing resources. For example, in such a system, only the client server(s) 504 needs to be utilized to predict information using an exemplary predictive model. Under other systems, where a predictive model refers to libraries stored on other devices, multiple devices may be used to determine a prediction using a model, and traffic of the network 506 would increase. Thus, the systems, methods, and computer readable media described herein provide for a more efficient way to use and deploy exemplary predictive models.

At least in some embodiments, the exemplary system 500 may also provide a computer system security as follows. For example, if an exemplary predictive model is deployed on the client server(s) 504 that does not rely on libraries stored on other devices to make predictions based on input data from the client device(s) 502, the other devices in system 500 may be more secure from various computer-based attacks. For example, in some embodiments, the exemplary system 500 of the present disclosure is configured so that only a limited number of trusted device may access the data in libraries that inform predictive models. As will be described further herein, the methods, systems, and computer readable media herein provide for such functionality by building and deploying models that are not dependent on the libraries from which those models were created to function.

The vendor server(s) 508 may be various types of servers. For example, the vendor server(s) 508 may include servers of third parties that help serve a webpage or perform some other function. For example, the vendor server(s) 508 may serve an advertisement to the client device(s) 502 as part of a web page or other information. The vendor may be a bidding service through which advertisers bid for space on a webpage, or may be a vendor that actually provides advertisements. Accordingly, in these examples, the vendor server(s) 508 may communicate with the client server(s) 504 and/or the client device(s) 502.

In other examples, vendor server(s) 508 may not communicate with the client device(s) 502 and/or the client server(s) 504. For example, the vendor server(s) 508 may be third party servers used to host computer code (e.g., a source code management platform such as Github™) libraries, etc., or the vendor server(s) 508 may be some other type of server or service that is used for model development and/or deployment. Similarly, internal server(s) 510 may also be used for development and/or deployment of an exemplary predictive model, but may be controlled and/or administrated by other devices used to develop and/or deploy models, such as the model risk office (MRO) device(s) 512, the data scientist/developer device(s) 514, and/or the engineer device(s) 516. Accordingly, the MRO device(s) 512, the data scientist/developer device(s) 514, and/or the engineer device(s) 516 may have access to and/or may communicate with some or all of the vendor server(s) 508 and/or the internal server(s) 510, while the client device(s) 502 and/or the client server(s) 502 may not have access to and/or communicate with some or all of the vendor server(s) 508 and/or the internal server(s) 510. For example, the MRO device(s) 512, the data scientist/developer device(s) 514, and/or the engineer device(s) 516 may use the internal server(s) 510 and/or the vendor server(s) 508 to develop an exemplary predictive model. Once the model is developed one or more of the MRO device(s) 512, the data scientist/developer device(s) 514, and/or the engineer device(s) 516 may cause the model to be deployed from the internal server(s) 510 and/or the vendor server(s) 508 to the client server(s) 504, such that the model may be used based on information from or determined about the client device(s) 502 (or a user associated with the client device(s) 502). In this way, the use of the deployed model is separate from the development, refitting, etc. of an exemplary predictive model. As described herein, the one or more cloud components 525 may be used similar to or in addition to any of the other components of FIG. 5.

Figure 6:
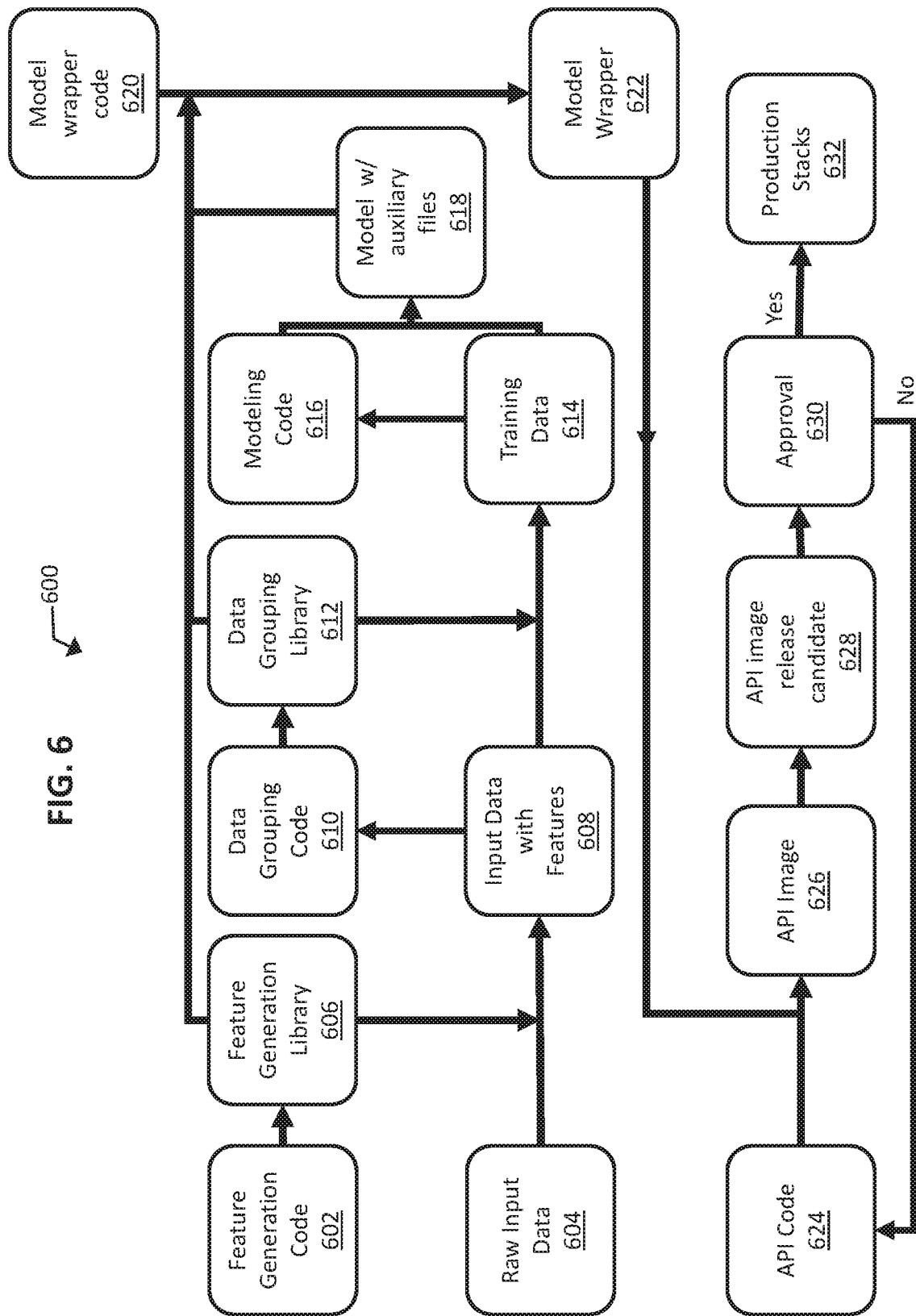
FIG. 6 is a block diagram illustrating a process for automating deployment of a predictive model in accordance with one or more embodiments of the present disclosure.

FIG. 6 is a block diagram illustrating a process 600 for automating deployment of a predictive model in accordance with one or more embodiments of the present disclosure. In the example of FIG. 6, the automation of development of an exemplary predictive model before going into production through an application programming interface (API) pulls source codes from five (5) different host locations. In other words, five (5) different computer code bases may be inputs for an exemplary predictive model using the processes described herein. Those codes may be stored on/by a source code management platform such as Github™. For example, the code may be hosted on the vendor server(s) 508, the internal server(s) 510, and/or the one or more cloud components 525 of FIG. 5. In the various model development pipeline embodiments described herein, there is no or very little mutual dependencies among the five (5) different computer codes that are used to develop and deploy an exemplary predictive model. The five (5) different input codes for developing an exemplary predictive model as described in the example of FIG. 6 include feature generation code 602, data grouping code 610, modeling code 616, model wrapper code 620, and API code 624.

By using five (5) different computer codes that are not mutually dependent on one another that are used to develop and deploy an exemplary predictive model, the process has five (5) different entry points that may be changed to adjust how a model works. As just one example, the API code 624 is applied to the model wrapper 622 so that the model that is ultimately deployed can receive and respond to API calls of a certain format. The API code 624 may be changed (e.g., using one of the data scientist/developer device(s) 514 and/or the engineer device(s) 516) to interact with different formats or types of API calls without changing how the underlying model works. Similarly, other codes may be changed without requiring that other codes be re-built as described further herein.

When changes to one of the codes (e.g., the feature generation code 602, the data grouping code 610, the modeling code 616, the model wrapper code 620, the API code 624) one of the codes occurs, the source code management platform (e.g., Github™) may determine that a change has been made to the code, and those changes may be pushed to an artifact repository/manager (e.g., Artifactory) where the built and deployed code is stored for use. In various embodiments, a build automation tool may be used to build and deploy code to a repository. For example, Maven by Apache may be used to build the code into an artifact that is stored on a repository. The pushing of changes of a code to the repository may happen automatically or may be initiated manually based on an input of a user (e.g., developer, data scientist, engineer). The push may also be triggered by an API call from the source code management platform. A pipeline (e.g., a server automation pipeline orchestrator such as a Jenkins pipeline) may be used to implement the changes based on such an API call. For example, the pipeline may retrieve or call changes to the code based on the API call notifying that a change has occurred. When the change is retrieved or called, the artifact may be rebuilt and deployed in the repository. Accordingly, any of the codes (e.g., the feature generation code 602, the data grouping code 610, the modeling code 616, the model wrapper code 620, the API code 624) may be changed and rebuilt/deployed in this manner into the respective artifact stored on the repository: the feature generation code 602 is built and deployed as a feature generation library 606, the data grouping code 610 is built and deployed as a data grouping library 612, the modeling code 616 is built and deployed as part of a model with auxiliary files 618, the model wrapper code 620 is built and deployed as a model wrapper 622, and the API code 624 is built and deployed as an API image 626.

In various embodiments, other pipelines and/or build automation tools may be used to build and/or deploy various artifacts/images based on codes stored on source code management platforms. For example, a Spark pipeline may also be used to import libraries (e.g., the feature generation library 606, the data grouping library 610) for use when analyzing data according to the process 600 of FIG. 6. A Spark pipeline may be a series of Spark actions or Spark jobs that carries out computation and data processing using Apache Spark. Another pipeline, such as a Jenkins pipeline, may be used in conjunction with the Spark pipeline to organize and schedule Spark actions and/or Spark jobs. In another example, the model code 616 may be code specially written for big-data analysis, such as H2O code. With H2O code, software runs may be called from various environments that are useful in analyzing large data sets to fit potential models to patterns in data. Accordingly, a pipeline between the modeling code 616, training data 614, and the model with auxiliary files 618 may be an H2O pipeline. Some pipelines, like the H2O pipeline, may be built on top other pipelines (e.g., the H2O pipeline may be built on top of a Jenkins pipeline) for more focused functionality. In yet other examples, the pipeline between the raw input data 604, the feature generation library 606, and input data with features may be a Spark pipeline.

The process 600 starts the feature generation code 602. The feature generation code 602 may be developed/written by one or more developers, for example, using the data scientist/developer device(s) 514 of FIG. 5. The feature generation code 602 is built and deployed to a repository to generate the feature generation library 606. The feature generation library 606 is then used to identify and/or generate features from or based on the raw input data 604. The feature generation code 602 may, for example, be built into a java library (e.g., the feature generation library 606) with maven in a Jenkins pipeline. The final artifact (the feature generation library 606) is pushed to a repository, such as Artifactory. Thus the feature generation code 602 by way of the feature generation library 606 is accessible and usable to identify features in the raw input data 602.

For example, the raw input data 604 may include any information associated with a URI request for a webpage from the client device(s) 502. For example, the raw input data 604 may include information such as an internet protocol (IP) address of a requesting device. The feature generation library is used to generate features based on that information. For example, features such as an internet and/or wireless service provider (e.g., Verizon™, Comcast™, T-Mobile™, Charter™, etc.) may be determined based on the IP address. A geographic location where the client device(s) 502 is located may also be determined from raw data like the IP address. Various types of features may be identified/determined from various types of raw input data. A developer using, for example, the data scientist/developer devic(s) 514 of FIG. 6 may therefore configured the feature generation code 602 to manage purpose and function of the feature generation library 606 so that certain types of features are determine/generated/etc. The feature generation library 602 is therefore the executable file that is used to convert the raw input data 604, such as IP address data into input data with features 608 (e.g., such that the input data with features 608 includes each of the IP address, the geographic location, and the service provider). The raw input data 604, as well as the input data with features 608 and the training data 614 may be stored on any type of server, database, and/or datastore. For example, the raw input data 604, the input data with features 608, and the training data 614 may be stored on one or more of the vendor server(s) 508, the internal server(s) 510, and/or the one or more cloud components 525 of FIG. 5. As one example of how the feature generation library 606 may be applied to the raw input data 604, an Apache Spark pipeline may be used to pull the feature generation library 606 and expand the raw input data 604 with extra feature data fields with a Resilient Distributed Dataset (RDD) map reduce function. Such a process yields the expanded input data with features 608.

The input data with features 608 is then studied to develop/write the data grouping code 610. The data grouping code 610 is designed to reduce the number of possible values for each feature. For example, if a feature is a geographic location, the geographic location of a large dataset may be more helpful if various specific geographic locations are grouped together in broader data groupings (e.g., by state/province, city, zip code, area code, or any other grouping). In another example, different combinations of multiple features may also be grouped together (e.g., Verizon™ users in a certain city) as desired. Similar to the feature generation code 602, the data grouping code 610 may be built by Maven through Jenkins and the artifact will be pushed to a repository such as Artifactory as the data grouping library 612. The data grouping code 610 may be developed manually or automatically. For example, one or more developers using the data scientist/developer device(s) 514 of FIG. 5 may write the data grouping code 610. In other examples, automatic processes may be used to generate data groupings for the data grouping code 610 based on the input data with features 608. Accordingly, the data grouping code 610 and the data grouping library 612 are designed to make a cleaner data set that may be more efficiently used to predict various things as further described herein.

The data grouping library 612 may then be pulled into another Spark pipeline along with the input data with features 608 to create the training data 614 having with reduced possible values for each field (e.g., rather than precise geographic coordinates, location data is grouped into broader categories). The training data 614 output may include all of the input data and features 608 and also the information about data groups after application of the data grouping library 612 (e.g., metrics about each group such as how big each aggregated feature group is, etc.). The data grouping library 612 may be applied to the input data with features 608 as described herein by, for example, performing data grouping with a data frame mapping function.

The modeling code 616 may then be developed by applying different machine learning algorithms to the training data 614. In particular, machine learning algorithms may be applied to the training data 614 to determine patterns in the training data 614. The machine learning algorithms applied may also be used to determine predictive information based on patterns recognized. For example, certain types of machine learning algorithms may indicate that certain types of data and/or values of data in the training data 614 indicate a predicted income level (e.g., location and service provider may be used to predict a user's income level). When it is determined which machine learning algorithms are desired (e.g., they fit the training data 614 best for making a prediction), that one or more machine learning algorithms may be used along with the training data 614 to develop the modeling code 616. In addition, the training data 614 and the modeling code 616 may also be used to generate auxiliary files, such that the training data 614 and the modeling code 616 are used to generate the model with auxiliary files 618. The modeling code 616, when combined with the training data 614 using the desired machine learning algorithms, will output the model with auxiliary files 618 and the results may be pushed to a repository such as Artifactory.

The auxiliary files act as configuration files for the model, such that the different grouping and feature types that exist within the training data may be identified/configured for use. For example, the auxiliary files may include information about the format and contents of the training data 614. In this way, when the predictive model is deployed, the auxiliary files may be used to identify features, data groupings, etc. of information related to new URI requests (e.g., from the client device(s) 502 of FIG. 5). In this way, the deployed predictive model will be able to properly recognize the correct type of features, data groupings, etc. to make a proper prediction using the model. In other words, the auxiliary files configure the predictive model so that it will function correctly. The auxiliary/configuration files may be attached/appended to the model.

Once a model wrapper 622, discussed further below, is built, the auxiliary/configuration files help the model wrapper 622 know feature value types (e.g., location, service provider) to identify or look for and how to do so. In other words, the auxiliary/configuration files allow a predictive model to merely identify certain types of information because the model wrapper 622 expects those types of information to be present in a certain format as configured by the auxiliary files. As long as the expected data is present, the model wrapper 622 can package that information from a request and use it to make a prediction based on the predictive model. In this way, the predictive model does not actually have to go through the feature generation and/or data grouping process to properly identify information that is relevant for making a particular prediction, as all the information and configuration information for making a prediction is inherent in the model wrapper 622.

Model wrapper code 620 may be written/developed, for example, by one or more engineers using the engineer device(s) 516 of FIG. 5. The model wrapper code 620 uses each of the feature generation library 606, the data grouping library 612, and the model with auxiliary files 618 to build the model wrapper 622. The model wrapper code 620, when compiled through a pipeline such as Jenkins, with all dependencies of the feature generation library 606, the data grouping library 612, and the model with auxiliary files 618 pulled, generates the model wrapper 622 that may score any type of data similar to the raw input data 604. For example, a raw input data of an IP address may be used to determine location (both specific similar to the feature generation or a broader location according to the data grouping) and/or a service provider associated with the IP address. That IP address together with the location (specific and broader location) may be used to generate a score (e.g., an income level) associated with the original raw input data (IP address). In other words, the raw input data may be fed into the predictive model to predict something. The libraries (e.g., the feature generation library 606, the data grouping library 612) may each be consumable by different types of pipelines. In other words, the libraries may be interoperable with multiple pipeline types. For example, the libraries may be pulled using a Jenkins pipeline when the model wrapper code 620 is applied to generate the model wrapper 622. The libraries may be pulled/imported by an Apache Spark pipeline when applying them to the raw input data 604 or the input data with features 608.

Accordingly, the model wrapper code 620 may be applied to pulled artifacts including the feature generation library 606, the data grouping library 612, and the model with auxiliary files 618 to compile an uber-jar artifact (e.g., the model wrapper 622) that is pushed to a repository such as Artifactory. In various embodiments, the model wrapper 622 may undergo testing and/or approval, either automated, manual, or some combination of the two. For example, a model risk office may indicate, via the model risk office (MRO) device(s) 512 of FIG. 5 that the model wrapper is approved for further deployment. The MRO may examine the previously discussed components that went into creating the model wrapper 622 to determine if the model is created to desired standards, and are approved to be used in an API service for actually making predictions from new raw input data that may be used to make other decisions. For example, if an income of a website user is predicted, a business decision of which product or service to promote on the website may be made based on the predicted income of the user.

When the model wrapper 622 is approved, although in various embodiments approval may not be required, an API code 624 may consume the model wrapper 622. Since the model wrapper 622 is self-sufficient in handling data queries (e.g., the model wrapper 622 need not refer back to any of the feature generation library 606, the data grouping library 612, and the model with auxiliary files 618 to handle data queries), the API code 624 may only focus on the supporting features such as networking and logging. In other words, the API code 624 may only include code for making the model wrapper 622 configurable to send and receive API calls as appropriate for a given system. The code will be built with maven using a Jenkins pipeline and 'a dev docker image of API' will be created and saved in a repository such as Artifactory. The API code 624 may be built and deployed to generate an API image 626 that incorporates the model wrapper 622. The API image 626 may be put through quality assurance (QA) checks to ensure that the API image 626 is operating correctly (e.g., the API image 626 may go through a Jenkins pipeline that tests all 16 gates). When all checks have passed, the image may be promoted to API release candidate image 628.

If the API release candidate image 628 is approved at step 630, the API release candidate image 628 may move to production. For example, a production release through Artemis may be used, such that when the Jenkins job for Artemis is triggered, it will ask for MRO approval before moving the API image to production. If the model wrapper 622 also requires approval before it is incorporated into the API image 626, the system may also ask for MRO approval of the model wrapper 622 as well. At the step 630, the integration of the model wrapper 622 and the API code 624 is checked. If the MRO rejects the integration at the step 630, then a revision may be made to the API code 624. If the MRO approves the integration at the step 630, a final pipeline (e.g., Jenkins pipeline) may launch the API release candidate image into production stacks 632. The production stacks 632 may be or include, for example, the client server(s) 504 and/or the one or more cloud computing components 525 of FIG. 5, such that raw input data relating to requests from the client device(s) 502 may be received and predictions may be made.

The MRO may approve the model wrapper 622 separate from the approval at the step 630 of the integration of the model wrapper 622 and the API code 624. The API code 624 may therefore be adjusted and the integration rechecked at the step 630 without the need to re-approve the model wrapper 622. In other systems, if the API code 624 integrates any of the feature generation library 606, the data grouping library 612, the model associated with the model with auxiliary files 618, and/or the model wrapper 622, some or all of those aspects may need to be re-approved if the API code 624 is adjusted at all. In the current process 600 of FIG. 6, the API code 624 may be updated without changing the model wrapper 622. Thus, the only portion that may be approved after the API code 624 is updated is the integration of the API code 624 and the model wrapper 622. This may save much valuable time and resources, including computing resources that may be used to re-approve various elements, either manually or automatically. In other words, the API code 624 is now just an interface with the model wrapper 622, and the API code 624 itself does not need to integrate the full feature generation library 606 and/or the data grouping library 612.

When an exemplary predictive model built according to the process 600 described herein is refit, the five (5) code components (e.g., the feature generation code 602, the data grouping code 610, the modeling code 616, the model wrapper code 620, and/or the API code 624) may be changed independently without affecting the stability of the other codes or the operation of a deployed predictive model. In other processes, for example, the feature generation library 606 and/or the data grouping library 610 are part of the API code 624. As a result, whenever one of those two code components is changed, the API code 624 would also undergo changes. However, because the process 600 includes a model wrapper 622, the feature generation library 606 and/or the data grouping library 610 are part of the API code 624 may be changed as desired before impacting the actual API code 624 (e.g., rebuilding and redeploying the API release candidate image 628). In other words, to change the data grouping library 610, for example, does not necessarily require changing the API code 624 (though after changes to the data grouping library 610 are made, those changes may eventually be incorporated into an updated model wrapper 622 and subsequently the API image 626 and the API release candidate image 628).

Other aspects of the process 600 also exist. For example, the data grouping code may include one or more wild card values. In this way, if there is a data value or feature that does not fit into a grouping, it may be categorized in the wild card group. For example, if data groupings categorize IP addresses into large cities, the IP address associated with a location in a rural area may not fit into one of the enumerated data groupings. Accordingly, those data values may be grouped in the wild card group.

Such wild card groupings provide significant benefits for the development and refitting of predictive models. For example, if different groups of users and/or computing resources are used to update the feature generation code 602 and the data grouping code 610, those codes may be more easily updated without delaying refits and/or causing refits to fail. For example, if the feature generation code 602 is updated to identify features not previously identified, the data grouping code 610 need not be updated for a refit of the predictive model to be successful. This is because the additional features identified may be grouped under the wild card grouping. That is, the features that would be unrecognized to the data grouping library 612 will not cause an exemplary predictive model refit to fail because those data values can be grouped under a wild card grouping. In this way, the unrecognized data may grouped in the wild card grouping until the data grouping code 610 is changed to capture the newly identified features, but the updating of each of the feature generation code 602 and the data grouping code 610 does not need to be perfectly timed on the same refit. In this way, the process 600 has flexibility over prior methods that do not include a wild card grouping value. In addition, the data grouping code 610 may be updated to add additional groupings for data that was already sorted into non-wild card groupings. For example, if a data grouping library 612 groups locations by state, the data grouping code 610 may be updated to further group location by city without affecting the other code components of FIG. 6.

Similarly, the modeling code with auxiliary files 618 uses a data set with expected variable names and does not actually incorporate the other code bases. Accordingly, as long as the names are correct (e.g., match the auxiliary files created according to the modeling code 616), there will be no impact from potentially extra features and/or extra data values present in the training data 614. Accordingly, the modeling code 616 too may be independently developed during a refit process. The variable names are expected because variables are grouped using the grouping code 610. For example, the feature the feature generation code may produce variables like "city" and "state" (e.g., "McLean" and "Virginia," respectively), while the grouping code 610 can create one or more variable names from the features generated pair and/or keep the original variable names output from the feature generation code 602. For example, the grouping code 610 may keep "state" grouping as a variable name (e.g., having a value of "Virginia") and may add a new variable name called "population density" (e.g., where features associated with a city like McLean is grouped as a "suburban" population density variable). In this way, the grouping code 610 defines the variable names, which may or may not be variables identified by the feature generation code 602. The modeling code 616 may then be written with the knowledge of what variable names or types the grouping code 610 will output, so that the data used in the modeling code 616 is recognizable and usable by the modeling code 616 because the data is recognized as certain variable types as categorized by the grouping code 610. As will be described further herein, unrecognized data may be categorized using a wild card variable name or data grouping, such that the grouping code 610 and the modeling code 616 may still function even if there is unrecognized data (e.g., data that is not grouped as a particular type of variable name).

The auxiliary files also act as configuration files for the model wrapper 622. The model wrapper code 620 may use the auxiliary files to understand the training data, apply the model, and use the feature generation library 606 and the data grouping library 612 to generate the model wrapper 622. In other words, when any of the modeling code 616, the data grouping code 610, the feature generation code 602, or any combination thereof is updated, the model does not need to be completely rebuilt performing ever single step of the process 600. If the data grouping code 610 has changed, the training data 614 and the auxiliary files may change, but the modeling code 616 need not change (though it may optionally be changed/updated). This further provides flexibility for refitting an exemplary predictive model. In various embodiments, technology that does not generate auxiliary files may be used. For example, some modeling code types may produce a clean packaged model where there might not be any auxiliary files. However, even in such embodiments, a clean packaged model without auxiliary files may still include the information necessary to identify data groupings (e.g., variable names). In other words, configuration files for the model may be incorporated into the model itself, rather than exist separately from the model as auxiliary files.

Accordingly, not only may the five (5) code components be updated independently, but an exemplary predictive model may actually be refit based on changes to one, some, or all of those code components because the codes are not directly dependent on one another. Lastly, once the API image release candidate 628 is deployed in the production stacks 632, the API portion only handles feeding API calls into the model wrapper artifact that is part of the API image release candidate 628. The API code 624 is not programmed how to, for example, do feature generation or data grouping or modeling. Instead, the API image release candidate 628 knows how to interpret incoming using the model wrapper 622, so that the API image release candidate 628 does not need to directly incorporate or call back to any of the component code bases to function properly. This provides a system where the component code bases may be adjusted without affecting operation of the deployed API image release candidate 628, and where the deployed API image release candidate 628 may be refit based on changes to fewer than all of the component codes bases without making changes to all of the component code bases.

These various embodiments may also offer increased security. In particular, since only the deployed API image release candidate 628 is exposed in the production stacks 632, and the component code bases are not, the system may be more secure. For example, client device(s) 502 of FIG. 5 would not interface with any code that is directly communicating with, using, or is one of the component code bases of the deployed predictive model. In various embodiments, the component code bases may be stored, changed, deployed to different computing devices than the production stacks 632 where the API image release candidate 628 is stored.

Various embodiments described herein may also include reduced inspections and quality checks (e.g., by the MRO). For example, an MRO inspection may only do approval of changes (a delta change) to a data grouping code or other change to a component code, which may make the inspection/approval process faster, providing faster implementation of refitted predictive models. In addition, such incremental approval may help avoid altogether lengthy, cumbersome approval processes for a refit, as all refits may be implemented more incrementally using the embodiments described herein.

Figure 7:
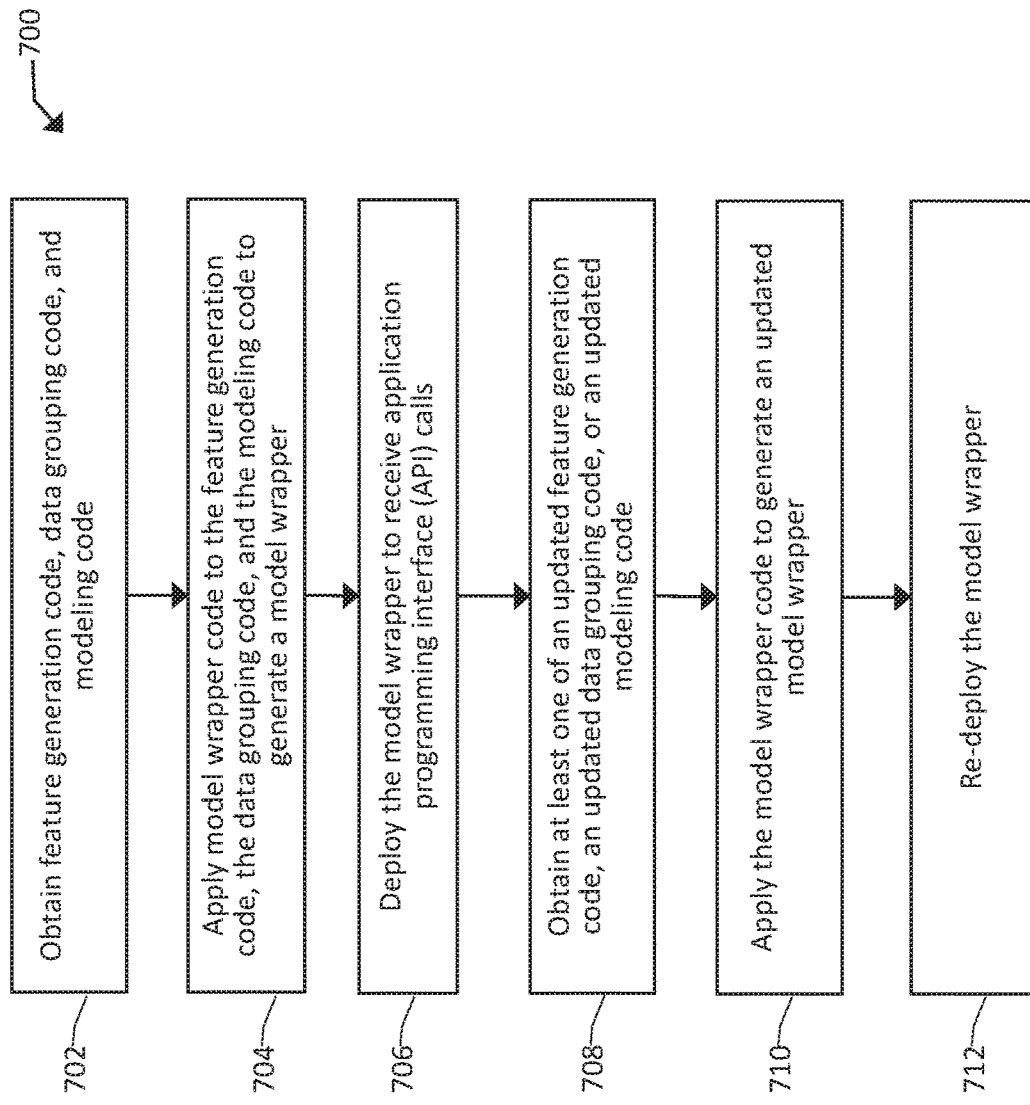
FIG. 7 is a flowchart illustrating a process for building, deploying, updating, and re-deploying a model wrapper in accordance with one or more embodiments of the present disclosure.

FIG. 7 is a flowchart illustrating a process 700 for building, deploying, updating, and re-deploying a model wrapper in accordance with one or more embodiments of the present disclosure. The process 700 focuses on operations that may be taken by a computing device that executes a model wrapper code such as the model wrapper code 620 of FIG. 6 to generate a model wrapper such as the model wrapper 622. The process 700 further describes updating or refitting the model and redeploying it based on the updates/refits.

At an operation 702, feature generation code, data grouping code, and modeling code are obtained. The feature generation code may be, for example, the feature generation library 606 that is built from the feature generation code 602 of FIG. 6. The feature generation library 606 may be stored in a repository, and thus the feature generation code is obtained from a repository. As described herein, the feature generation code is configured to determine features relating to input data, such as the raw input data 604 of FIG. 6.

Similar to how the feature generation code may be obtained, the data grouping code may be obtained from a repository. For example, the data grouping code 610 of FIG. 6 may be built and deployed as the data grouping library 612. The data grouping code may be configured to generate training data by determining a plurality of data groupings for the features relating to the input data as described herein. The plurality of data groupings may include a wildcard data grouping, such that unrecognized feature(s) relating to the input data may be assigned to the wildcard data grouping.

The modeling code may also be obtained from a repository. For example, the modeling code 616 of FIG. 6 may be built and deployed as at least part of the model with auxiliary files 618. The modeling code is derived at least in part by applying one or more machine learning algorithms to the training data as described herein.

In various embodiments, obtaining the modeling code may further include obtaining modeling code configuration files along with the modeling code from the modeling code repository. The modeling code configuration files may be, for example, the auxiliary files of FIG. 6. The modeling code configuration files may include information about the format and contents of the modeling code. The model wrapper code may be applied to generate the model wrapper based at least in part on the modeling code configuration files. The modeling code configuration files may be generated based at least in part on the modeling code and the training data.

At an operation 704, a model wrapper code, such as the model wrapper code 620 of FIG. 6, is applied to the obtained feature generation code, the data grouping code, and the modeling code to generate a model wrapper, such as the model wrapper 622 of FIG. 6. At an operation 706, the model wrapper is deployed as described herein. For example, as shown and described with respect to FIG. 6, a model wrapper such as the model wrapper 622 may be deployed by having the API code 624 applied to the model wrapper 622 to generate an API image 626 and may eventually be released after approval into the production stacks 632 of FIG. 6 for use. After deployment, the model wrapper is configured to receive a first API call comprising an input data value. As described herein, the input data value may be of a similar type to a type of data in the raw input data 604 of FIG. 6. In this way, the predictive model may process the input data value to determine a score relating to the input data value, and the system may then send a second API call comprising the score in response to the first API call. In various embodiments as described herein, the score relating to the input data value may be determined only by the model wrapper (or aspects of the model wrapper within an API image, for example) such that none of the feature generation code stored in the feature generation code repository, the data grouping code stored in the data grouping code repository, and the modeling code stored in the modeling code repository are used to determine the score. In other words, the code components used to build the model wrapper and are incorporated into the model wrapper 622 (and subsequently the API image 626) as artifacts, such that the API image 626, which is an executable, may invoke each of the feature generation, data grouping, and modeling codes may be invoked when the API image 626 is used to determine a score. Accordingly, only a single image or executable (the API image 626) is used to determine a score so that the other intermediate images (e.g., the feature generation, data grouping, and modeling codes) may be changed, adjusted, etc. without affecting the functioning of the API image 626 because the artifacts associated with the feature generation, data grouping, and modeling codes are already incorporated into the API image 626.

At an operation 708, updated code including at least one of an updated feature generation code, an updated data grouping code, or an updated modeling code is obtained. As an example, obtaining the updated code may include obtaining one or two of, but not all three of, an updated feature generation code, an updated data grouping code, or an updated modeling code. At an operation 710, the model wrapper code is re-applied to generate an updated model wrapper. At an operation 712, the updated model wrapper is re-deployed so that the changes/updates to the generation code, the data grouping code, and/or the modeling code are incorporated in the updated model wrapper.

As described herein with respect to various embodiments, after the model wrapper is generated and/or updated, any change to any of the feature generation code, the data grouping code, and/or the modeling code does not affect or change the model wrapper without reapplying the model wrapper code to any changed code. As also described herein, an approval request may be sent to a supervisor electronic device after the model wrapper is generated. An approval may then be received from the supervisor electronic device to approve of the model wrapper in response to the approval request. In various embodiments, the model wrapper may be deployed only after the approval of the model wrapper is received. In various embodiments, after the approval is received, the model wrapper may be stored on a server system such that the model wrapper is made available to receive incoming API calls.

In various embodiments, the deployment of the model wrapper may include sending the model wrapper to a model wrapper repository and applying an API code, such as the API code 624 to the model wrapper to generate an API image configured to send and receive API calls. The API image may be, for example, the API image 626 of FIG. 6.

In various embodiments, updated code for refitting a model may include only one of the updated feature generation code, the updated data grouping code, or the updated modeling code, such that the applying of the model wrapper code comprises applying the model wrapper code to: (1) the updated feature generation code, the data grouping code, and the modeling code to generate the updated model wrapper; (2) the feature generation code, the updated data grouping code, and the modeling code to generate the updated model wrapper; or (3) the feature generation code, the data grouping code, and the updated modeling code to generate the updated model wrapper. In other embodiments, the updated code for refitting a model may include comprises only/exactly two of the updated feature generation code, the updated data grouping code, and the updated modeling code, such that the applying of the model wrapper code comprises applying the model wrapper code to: (1) the updated feature generation code, the updated data grouping code, and the modeling code to generate the updated model wrapper; (2) the feature generation code, the updated data grouping code, and the updated modeling code to generate the updated model wrapper; or (3) the updated feature generation code, the data grouping code, and the updated modeling code to generate the updated model wrapper.

In various embodiments as described herein, the feature generation code may be stored as a feature generation library artifact in the feature generation code repository, the data grouping code may be stored as a data grouping library artifact in the data grouping code repository, and the modeling code may be stored along with the modeling code configuration files as a modeling artifact in the modeling code repository. Accordingly, the various codes may be built and deployed into repositories such as Artifactory as described herein. Similarly, the model wrapper code may be applied to the feature generation library artifact, the data grouping library artifact, and the modeling artifact to generate the model wrapper as a model wrapper artifact, and the model wrapper artifact may be stored in a model wrapper repository.

Figure 8:
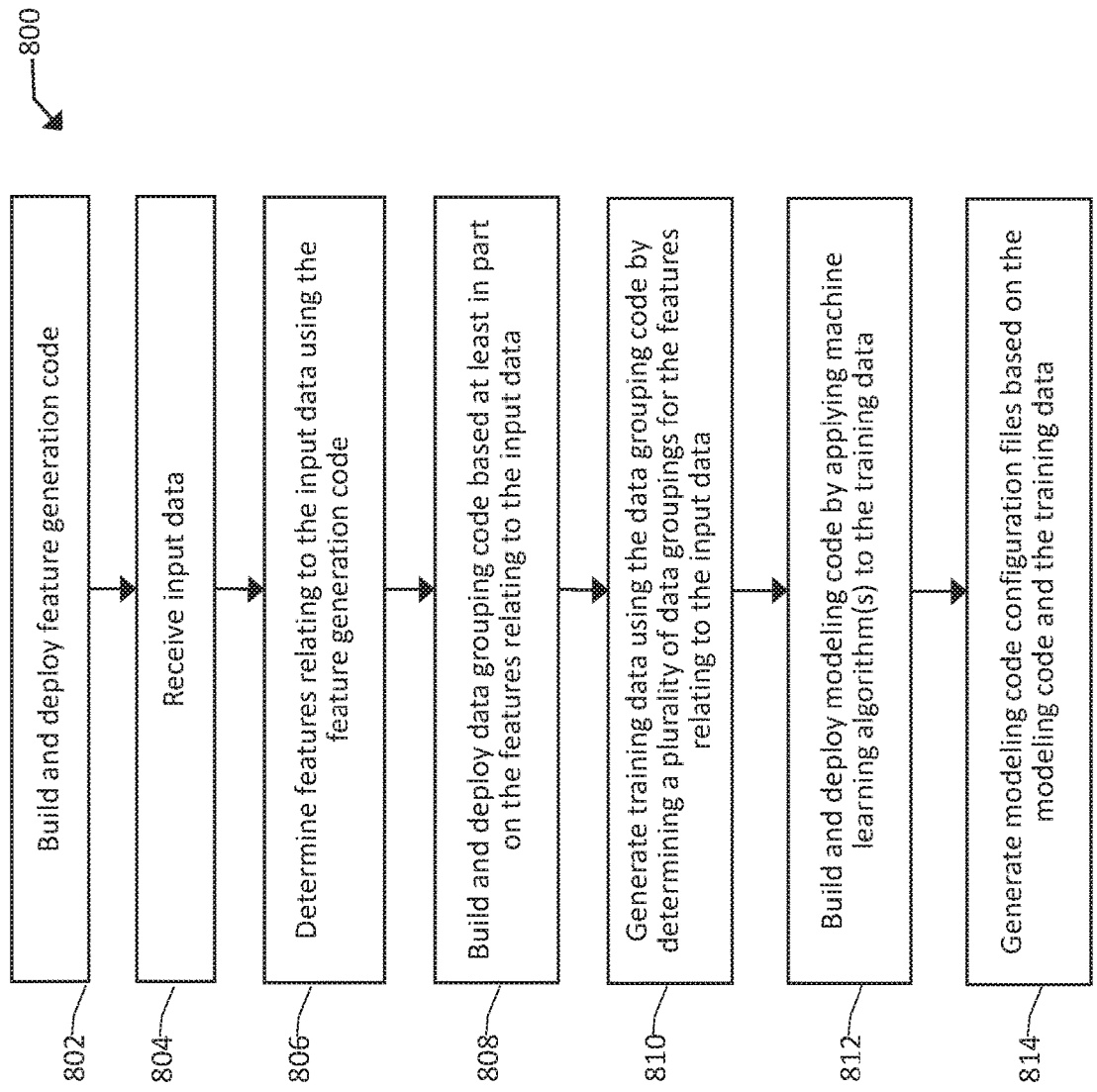
FIG. 8 is a flowchart illustrating a process for building and deploying feature generation code, data grouping code, and modeling code in accordance with one or more embodiments of the present disclosure.

FIG. 8 is a flowchart illustrating a process 800 for building and deploying feature generation code, data grouping code, and modeling code in accordance with one or more embodiments of the present disclosure. In an operation 802, the feature generation code is built and deployed to a repository. In an operation 804, input data such as the raw input data 604 of FIG. 6 is received. In an operation 806, features relating to the input data are determined using the deployed feature generation code, which may be the feature generation library 606 as described herein with respect to FIG. 6.

In an operation 808, data grouping code is built and deployed to a repository, which may or may not be the same repository or same type of repository to which the feature generation code is deployed. In an operation 810 training data is generated using the data grouping code by determining a plurality of data groupings for the features relating to the input data. The data groupings may include a wildcard data grouping, and at least one unrecognized feature relating to the input data may be assigned to the wildcard data grouping.

In an operation 812, modeling code is built and deployed to the repository. The modeling code is derived at least in part by applying one or more machine learning algorithms to the training data, where the feature generation code, the data grouping code, and the modeling code are configured to be pulled from their respective repositories by a model wrapper code. In an operation 814, modeling code configuration files are generated that include information about the format and contents of the modeling code. The model wrapper code generates a model wrapper configured to, after deployment of the model wrapper, send and receive API calls to use a model to make a predictive determination as described herein. The modeling code configuration files may be deployed to the repository along with the modeling code.

In various embodiments, an approval request may be sent, after determining the features relating to the input data, an approval request to a supervisor electronic device. An approval may be received, from the supervisor electronic device, of the features relating to the input data in response to the approval request. In various embodiments, the training data may be generated only after the approval is received.

In various embodiments, the one or more machine learning algorithms include a plurality of machine learning algorithms, and a selection may be received of at least one of the plurality of machine learning algorithms with which to generate the modeling code. In other words, in the iterative process of analyzing the training data with machine learning algorithms, at least one of the algorithms tested may be used to build the model with auxiliary files as described herein. Accordingly, the modeling code may be generated based at least in part on the selected at least one of the plurality of machine learning algorithms.

In various embodiments and as described herein, the feature generation code, the data grouping code, and the modeling code are each configured to be updated individually such that updating of any one of the feature generation code, the data grouping code, and the modeling code does not cause any of the other codes to be inoperable. For example, the wild card grouping of the data grouping code helps make this possible as described herein. As another example, the modeling code may only recognize labels in training data, so the number or type of groupings in the training data (including changes to the data groupings) does not hinder the ability of the modeling code to use the training data to generate the model with auxiliary files. This occurs at least in part because information about the data groupings in the training data is used by the modeling code to interpret the data, and at least in part because that information about the data grouping can be passed along to the model wrapper code in the auxiliary files.

Figure 9:
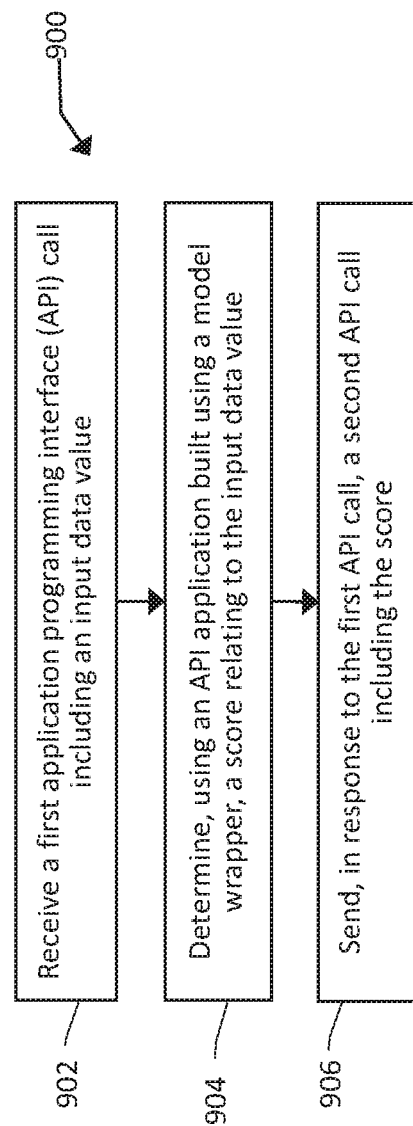
FIG. 9 is a flowchart illustrating a process for using a model wrapper to respond to an application programming interface (API) call in accordance with one or more embodiments of the present disclosure.

FIG. 9 is a flowchart illustrating a process 900 for using a model wrapper to respond to an application programming interface (API) call in accordance with one or more embodiments of the present disclosure. In an operation 902, a first application program interface (API) call is received that includes an input data value. As described herein, the input data value may include one or more data values related to a request from a client device, such as an IP address.

In an operation 904, a score relating to the input data value is determined using a model wrapper. As described herein, the model wrapper may be combined with an API code so that incoming API calls may cause the model wrapper to return a value based on the predictive model. As further described herein, the model wrapper may be generated by applying a model wrapper code to a feature generation code, a data grouping code, and a modeling code. The feature generation code may determine features relating to input data, the data grouping code may generate training data by determining a plurality of data groupings for the features relating to the input data, and the modeling code may be derived at least in part by applying one or more machine learning algorithms to the training data.

In an operation 906, in response to the first API call, a second API call including the score is sent. The second API call may be sent back to the device that requested it or another device. For example, the first API call may be received from a first server that processes URI requests for webpages. The second API call may be sent to a second server that delivers advertisements to predetermined places on webpages. In this way, the second server may, for example, determine an advertisement to send to the first server, which may be served to the device which sent the URI request as part of a webpage. In another example, the second API call may be sent to a third server that, for example, sends emails to known users of a webpage. The score in the second API call may be used to determine the content of an email to one of the known users from which a URI request originated. In various embodiments, any type of communication, display, message, voice assistant speech, etc. may be determined based on a score or other output of the predictive models described herein.

In various embodiments, the feature generation code, the data grouping code, and the modeling code stored in their respective repositories are not specifically invoked by the model wrapper to determine the score. Instead, those code bases are incorporated into the model wrapper such that when the model wrapper is deployed (e.g., as an uber jar), the artifacts of those three codebases become part of the model wrapper itself (e.g., part of the uber jar). The model wrapper code may be a framework to combine the three codebases so that they may be used independently of the artifacts of those codebases stored in their respective repositories. In various embodiments, changes may be made to any of the three codebases without changing the functioning of the model wrapper (or its deployment in an API image). In addition, changes to any of the feature generation code, the data grouping code, and/or the modeling code may cause model wrapper artifact build pipeline to be triggered such that the model wrapper may be rebuilt according to the changes made. In other words, the model wrapper when generated may have everything it needs to generate a score without utilizing the actual feature generation code, the data grouping code, and the modeling code stored in their respective repositories because the codes are incorporated into the model wrapper. As a result, the feature generation code, the data grouping code, and the modeling code may be updated without changing or affecting the model wrapper. Though the model wrapper may eventually be updated to reflect changes in the other codes as desired, the actual act of changing the other codes does not automatically change the model wrapper or cause the model wrapper to lose functionality.

In various embodiments, more than one input data value may be received based upon which the score is determined. Such a plurality of input data values may be received as part of the first API call. The plurality of input data values may also be packaged together as a JSON file type. Other determined data such as features and/or data groupings based on the input data values may also be packaged together in the JSON file.

In various embodiments as described herein, the model wrapper may be deployed by applying an API code to the model wrapper to generate an API image that may to receive the first API call and send the second API call. The system may also receive, from a supervisor electronic device after the API image has been generated, an approval of the API image. After the approval is received, the API image may be stored on a server system and made available to receive incoming API calls.

The various embodiments described herein may minimize discrepancies of data transformation between the training stage of a machine learning model and the scoring stage of a machine learning model (e.g., the actual use of the model). In other words, the same code and logic used to transform raw data into training data is directly used in the model wrapper. Therefore, the model wrapper and by extension the API image may accept and use to calculate a score the most primitive or raw data such as an IP address. In systems where the same code and logic is not used, the training data may be transformed in the training stage using a feature generation library of a first version, for example, which converts a given IP address to Mclean, Va., while the feature generation library used for scoring by a deployed model may use an updated feature generation library (e.g., a second version). Such difference may lead to errors in generating or recognizing features, as the updated library may, for example, place the same IP address in Richmond, Va. because the ISP has reassigned the IP address sometime between the releases of the first and second versions of the feature generation library. Accordingly, the models deployed herein may more accurately recognize features because they incorporate the code base on which the model was actually trained.

At least some aspects of the present disclosure will now be described with reference to the following numbered clauses.

1. A method comprising: obtaining, by one or more processors, feature generation code from a feature generation code repository, wherein the feature generation code is configured to determine features relating to input data; obtaining, by the one or more processors, data grouping code from a data grouping code repository, wherein the data grouping code is configured to generate training data by determining a plurality of data groupings for the features relating to the input data; obtaining, by the one or more processors, modeling code from a modeling code repository, wherein the modeling code is derived at least in part by applying one or more machine learning algorithms to the training data; applying, by the one or more processors, a model wrapper code to the feature generation code, the data grouping code, and the modeling code to generate a model wrapper; deploying, by the one or more processors, the model wrapper such that, after deployment, the model wrapper is configured to: receive a first application programming interface (API) call comprising an input data value, determine a score relating to the input data value, and send a second API call comprising the score in response to the first API call; obtaining updated code, wherein the updated code comprises one or two of, but not all three of, an updated feature generation code, an updated data grouping code, or an updated modeling code; and applying the model wrapper code to the updated code to generate an updated model wrapper.

2. The method of clause 1, wherein, after the model wrapper is generated, any change to any of the feature generation code, the data grouping code, or the modeling code does not affect or change the model wrapper without reapplying the model wrapper code to any changed code.

3. The method of clause 1, further comprising: sending, by the one or more processors after the model wrapper is generated, the model wrapper and an approval request to a supervisor electronic device; and receiving, by the one or more processors from the supervisor electronic device, an approval of the model wrapper in response to the approval request.

4. The method of clause 3, wherein the model wrapper is deployed only after the approval of the model wrapper is received.

5. The method of clause 1, wherein the deployment of the model wrapper comprises: sending, by the one or more processors, the model wrapper to a model wrapper repository; and applying, by the one or more processors, an API code to the model wrapper to generate an API image configured to send and receive API calls.

6. The method of clause 1, further comprising obtaining, by the one or more processors, modeling code configuration files along with the modeling code from the modeling code repository, wherein the modeling code configuration files comprise information about the format and contents of the modeling code.

7. The method of clause 1, wherein the input data value and the input data comprise a same type of data.

8. The method of clause 1, wherein the updated code comprises only one of the updated feature generation code, the updated data grouping code, or the updated modeling code, such that the applying of the model wrapper code comprises applying the model wrapper code to: the updated feature generation code, the data grouping code, and the modeling code to generate the updated model wrapper; the feature generation code, the updated data grouping code, and the modeling code to generate the updated model wrapper; or the feature generation code, the data grouping code, and the updated modeling code to generate the updated model wrapper.

9. The method of clause 1, wherein the updated code comprises only two of the updated feature generation code, the updated data grouping code, and the updated modeling code, such that the applying of the model wrapper code comprises applying the model wrapper code to: the updated feature generation code, the updated data grouping code, and the modeling code to generate the updated model wrapper; the feature generation code, the updated data grouping code, and the updated modeling code to generate the updated model wrapper; or the updated feature generation code, the data grouping code, and the updated modeling code to generate the updated model wrapper.

10. A system comprising: a memory; at least one processor coupled to the memory, the processor configured to: obtain feature generation code from a feature generation code repository, wherein the feature generation code is configured to determine features relating to input data; obtain data grouping code from a data grouping code repository, wherein the data grouping code is configured to generate training data by determining a plurality of data groupings for the features relating to the input data; obtain modeling code and modeling code configuration files from a modeling code repository, wherein: the modeling code is derived at least in part by applying one or more machine learning algorithms to the training data, and the modeling code configuration files comprise information about the format and contents of the modeling code; apply a model wrapper code to the feature generation code, the data grouping code, and the modeling code to generate a model wrapper; and deploy the model wrapper such that, after deployment, the model wrapper is configured to: receive a first application programming interface (API) call comprising an input data value, determine a score relating to the input data value, and send a second API call comprising the score in response to the first API call.

11. The system of clause 10, wherein the model wrapper code is applied to generate the model wrapper based at least in part on the modeling code configuration files.

12. The system of clause 10, wherein the modeling code configuration files are generated based at least in part on the modeling code and the training data.

13. The system of clause 10, wherein the feature generation code is stored as a feature generation library artifact in the feature generation code repository, the data grouping code is stored as a data grouping library artifact in the data grouping code repository, and the modeling code is stored along with the modeling code configuration files as a modeling artifact in the modeling code repository.

14. The system of clause 13, wherein the model wrapper code is applied to the feature generation library artifact, the data grouping library artifact, and the modeling artifact to generate the model wrapper as a model wrapper artifact.

15. The system of clause 14, wherein the at least one processor is further configured to store the model wrapper artifact in a model wrapper repository.

16. A non-transitory computer readable medium having instructions stored thereon that, upon execution by a computing device, cause the computing device to perform operations comprising: obtaining feature generation code from a feature generation code repository, wherein the feature generation code is configured to determine features relating to input data; obtaining, by the one or more processors, data grouping code from a data grouping code repository, wherein the data grouping code is configured to generate training data by: determining a plurality of data groupings for the features relating to the input data, wherein the plurality of data groupings comprises a wildcard data grouping, and assigning at least one unrecognized feature relating to the input data to the wildcard data grouping; obtaining modeling code from a modeling code repository, wherein the modeling code is derived at least in part by applying one or more machine learning algorithms to the training data; applying a model wrapper code to the feature generation code, the data grouping code, and the modeling code to generate a model wrapper; and deploying the model wrapper such that, after deployment, the model wrapper is configured to: receive a first application programming interface (API) call comprising an input data value, determine a score relating to the input data value, and send a second API call comprising the score in response to the first API call.

17. The non-transitory computer readable medium of clause 16, wherein deploying the model wrapper comprises applying an API code to the model wrapper.

18. The non-transitory computer readable medium of clause 17, wherein the computing device is further configured to receive, from a supervisor electronic device after the model wrapper has been deployed, an approval of the model wrapper.

19. The non-transitory computer readable medium of clause 18, wherein the computing device is further configured to, after the approval is received, store the model wrapper on a server system and make the model wrapper available to receive incoming API calls.

20. The non-transitory computer readable medium of clause 16, wherein the score relating to the input data value is determined only by the model wrapper, such that none of the feature generation code stored in the feature generation code repository, the data grouping code stored in the data grouping code repository, and the modeling code stored in the modeling code repository are used to determine the score.

Any publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A method comprising:
   obtaining, by one or more processors, feature generation code from a feature generation code repository, wherein the feature generation code is configured to determine features relating to input data;
   obtaining, by the one or more processors, data grouping code from a data grouping code repository, wherein the data grouping code is configured to generate training data by determining a plurality of data groupings for the features relating to the input data;
   obtaining, by the one or more processors, modeling code from a modeling code repository, wherein the modeling code is derived at least in part by applying one or more machine learning algorithms to the training data;
   applying, by the one or more processors, a model wrapper code to the feature generation code, the data grouping code, and the modeling code to generate a model wrapper;
   deploying, by the one or more processors, the model wrapper such that, after deployment, the model wrapper is configured to:
      receive a first application programming interface (API) call comprising an input data value,
      determine a score relating to the input data value, and
      send a second API call comprising the score in response to the first API call;
   obtaining updated code, wherein the updated code comprises one or two of, but not all three of, an updated feature generation code, an updated data grouping code, or an updated modeling code; and
   applying the model wrapper code to the updated code to generate an updated model wrapper.

2. The method of claim 1, wherein, after the model wrapper is generated, any change to any of the feature generation code, the data grouping code, or the modeling code does not affect or change the model wrapper without reapplying the model wrapper code to any changed code.

3. The method of claim 1, further comprising:
   sending, by the one or more processors after the model wrapper is generated, the model wrapper and an approval request to a supervisor electronic device; and
   receiving, by the one or more processors from the supervisor electronic device, an approval of the model wrapper in response to the approval request.

4. The method of claim 3, wherein the model wrapper is deployed only after the approval of the model wrapper is received.

5. The method of claim 1, wherein the deployment of the model wrapper comprises:
   sending, by the one or more processors, the model wrapper to a model wrapper repository; and
   applying, by the one or more processors, an API code to the model wrapper to generate an API image configured to send and receive API calls.

6. The method of claim 1, further comprising obtaining, by the one or more processors, modeling code configuration files along with the modeling code from the modeling code repository, wherein the modeling code configuration files comprise information about the format and contents of the modeling code.

7. The method of claim 1, wherein the input data value and the input data comprise a same type of data.

8. The method of claim 1, wherein the updated code comprises only one of the updated feature generation code, the updated data grouping code, or the updated modeling code, such that the applying of the model wrapper code comprises applying the model wrapper code to:
   the updated feature generation code, the data grouping code, and the modeling code to generate the updated model wrapper;
   the feature generation code, the updated data grouping code, and the modeling code to generate the updated model wrapper; or
   the feature generation code, the data grouping code, and the updated modeling code to generate the updated model wrapper.

9. The method of claim 1, wherein the updated code comprises only two of the updated feature generation code, the updated data grouping code, and the updated modeling code, such that the applying of the model wrapper code comprises applying the model wrapper code to:
   the updated feature generation code, the updated data grouping code, and the modeling code to generate the updated model wrapper;
   the feature generation code, the updated data grouping code, and the updated modeling code to generate the updated model wrapper; or
   the updated feature generation code, the data grouping code, and the updated modeling code to generate the updated model wrapper.

10. A system comprising:
   a memory;
   at least one processor coupled to the memory, the processor configured to:
   obtain feature generation code from a feature generation code repository, wherein the feature generation code is configured to determine features relating to input data;
   obtain data grouping code from a data grouping code repository, wherein the data grouping code is configured to generate training data by determining a plurality of data groupings for the features relating to the input data;
   obtain modeling code and modeling code configuration files from a modeling code repository, wherein:
      the modeling code is derived at least in part by applying one or more machine learning algorithms to the training data, and
      the modeling code configuration files comprise information about the format and contents of the modeling code;
   apply a model wrapper code to the feature generation code, the data grouping code, and the modeling code to generate a model wrapper; and
   deploy the model wrapper such that, after deployment, the model wrapper is configured to:
      receive a first application programming interface (API) call comprising an input data value,
      determine a score relating to the input data value, and
      send a second API call comprising the score in response to the first API call.

11. The system of claim 10, wherein the model wrapper code is applied to generate the model wrapper based at least in part on the modeling code configuration files.

12. The system of claim 10, wherein the modeling code configuration files are generated based at least in part on the modeling code and the training data.

13. The system of claim 10, wherein the feature generation code is stored as a feature generation library artifact in the feature generation code repository, the data grouping code is stored as a data grouping library artifact in the data grouping code repository, and the modeling code is stored along with the modeling code configuration files as a modeling artifact in the modeling code repository.

14. The system of claim 13, wherein the model wrapper code is applied to the feature generation library artifact, the data grouping library artifact, and the modeling artifact to generate the model wrapper as a model wrapper artifact.

15. The system of claim 14, wherein the at least one processor is further configured to store the model wrapper artifact in a model wrapper repository.

16. A non-transitory computer readable medium having instructions stored thereon that, upon execution by a computing device, cause the computing device to perform operations comprising:
   obtaining feature generation code from a feature generation code repository, wherein the feature generation code is configured to determine features relating to input data;
   obtaining, by the one or more processors, data grouping code from a data grouping code repository, wherein the data grouping code is configured to generate training data by:
     determining a plurality of data groupings for the features relating to the input data,
     wherein the plurality of data groupings comprises a wildcard data grouping, and
     assigning at least one unrecognized feature relating to the input data to the wildcard data grouping;
   obtaining modeling code from a modeling code repository, wherein the modeling code is derived at least in part by applying one or more machine learning algorithms to the training data;
   applying a model wrapper code to the feature generation code, the data grouping code, and the modeling code to generate a model wrapper; and
   deploying the model wrapper such that, after deployment, the model wrapper is configured to:
     receive a first application programming interface (API) call comprising an input data value,
     determine a score relating to the input data value, and
     send a second API call comprising the score in response to the first API call.

17. The non-transitory computer readable medium of claim 16, wherein deploying the model wrapper comprises applying an API code to the model wrapper.

18. The non-transitory computer readable medium of claim 17, wherein the computing device is further configured to receive, from a supervisor electronic device after the model wrapper has been deployed, an approval of the model wrapper.

19. The non-transitory computer readable medium of claim 18, wherein the computing device is further configured to, after the approval is received, store the model wrapper on a server system and make the model wrapper available to receive incoming API calls.

20. The non-transitory computer readable medium of claim 16, wherein the score relating to the input data value is determined only by the model wrapper, such that none of the feature generation code stored in the feature generation code repository, the data grouping code stored in the data grouping code repository, and the modeling code stored in the modeling code repository are used to determine the score.

* * * * *